US008625709B2

(12) United States Patent
Stopler

(10) Patent No.: US 8,625,709 B2
(45) Date of Patent: Jan. 7, 2014

(54) DEVICE METHOD AND SYSTEM FOR COMMUNICATING DATA

(75) Inventor: Daniel Stopler, Holon (IL)

(73) Assignee: Amimon Ltd., Herzlia (IL)

( * ) Notice: Subject to any disclaimer, the term of this patent is extended or adjusted under 35 U.S.C. 154(b) by 300 days.

(21) Appl. No.: 12/929,344

(22) Filed: Jan. 18, 2011

(65) Prior Publication Data

US 2011/0176618 A1 Jul. 21, 2011

Related U.S. Application Data

(60) Provisional application No. 61/282,301, filed on Jan. 19, 2010.

(51) Int. Cl.
*H04B 1/66* (2006.01)
*H04L 27/00* (2006.01)

(52) U.S. Cl.
USPC ............................. 375/295; 375/240; 375/259

(58) Field of Classification Search
USPC ............. 375/240, 240.01, 259, 295, 316, 340
See application file for complete search history.

(56) References Cited

U.S. PATENT DOCUMENTS 6,909,753 B2 * 6/2005 Meehan et al. .......... 375/240.27
2004/0049725 A1 * 3/2004 Golitschek et al. ............ 714/749

OTHER PUBLICATIONS

Hekland et al., "Using 2:1 Shannon Mapping for Joint Source-Channel Coding", May 2005, BEATS/WIP Workshop, Tunisia, May 2005, pp. 1-16.*
Yao et al., "Analog Network Coding Mappings for the Gaussian Multiple-Access Relay Channel", IEEE International Symposium on Information Theory, ISIT 2009, Seoul, Korea, Jun. 28-Jul. 3, 2009, pp. 104-108.*

* cited by examiner

*Primary Examiner* — David B. Lugo
(74) *Attorney, Agent, or Firm* — Eitan, Mehulal & Sadot

(57) ABSTRACT

Disclosed is a method, circuit and system for communicating data. A data value to be transmitted from a data source transmitter or transceiver to a downstream receiver or transceiver may be Shannon mapped, by functionally associated processing/mapping logic, to a point on a shape within a higher dimensional plane. Different portions of the shape, for example branches of a spiral, may be designated by a portion or branch number. Coordinates of the Shannon mapping, or another descriptors, of the Shannon mapped point may be transmitted using analog transmission methods. A set of data values may be Shannon mapped and transmitted to a downstream receiver/transceiver in series. For each set of mapped and transmitted data values, processing logic may calculate a branch ambiguity resolution factor. The branch ambiguity resolution factor for each set of values may be transmitted to the downstream receiver/transceiver before, after or with the data values. Decoding logic associated with the downstream receiver/transceiver may then use the branch ambiguity resolution factor to convert/decode received coordinates associated with the set of values into the data values.

10 Claims, 7 Drawing Sheets

DEVICE METHOD AND SYSTEM FOR COMMUNICATING DATA

CROSS REFERENCE

The present application claims the benefit from U.S. Provisional Application 61/282,301 filed Jan. 19, 2010, the disclosure of which is incorporated herein by reference.

FIELD OF THE INVENTION

Some embodiments relate generally to the field of wireless communication and, more particularly, to a device, method and system for communicating data.

BACKGROUND

Wireless communication has rapidly evolved over the past decades. Even today, when high performance and high bandwidth wireless communication equipment is made available there is demand for even higher performance at a higher data rates, which may be required by more demanding applications.

Video signals may be generated by various video sources, for example, a computer, a game console, a Video Cassette Recorder (VCR), a Digital-Versatile-Disc (DVD), a Blu-ray (BR) disk player, or any other suitable video source. In many houses, for example, video signals are received through cable or satellite links at a Set-Top Box (STB) located at a fixed point.

In many cases, it may be desired to place a screen or projector at a location in a distance of at least a few meters from the video source. This trend is becoming more common as flat-screen displays, e.g., plasma or Liquid Crystal Display (LCD) televisions are hung on a wall. Connection of such a display or projector to the video source through cables is generally undesired for aesthetic reasons and/or installation convenience. Thus, wireless transmission of the video signals from the video source to the screen is preferred.

WHDI—Wireless Home Digital Interface is a standard for wireless high-definition video connectivity between a video source (e.g. cable box) and video sink (e.g. display). It provides a high-quality, uncompressed wireless link which can support delivery of equivalent video data rates of up to 3 Gbit/s (including uncompressed 1080p) in a 40 MHz channel within the 5 GHz unlicensed band. Equivalent video data rates of up to 1.5 Gbit/s (including uncompressed 1080i and 720p) can be delivered on a single 20 MHz channel in the 5 GHz unlicensed band, conforming to worldwide 5 GHz spectrum regulations. Range is beyond 100 feet (30 m), through walls, and latency is less than one millisecond.

In some cases, it may be desired to transmit analog source values over a noisy and bandwidth limited channels. By mapping source dimension values into multiple channel dimensions, the signal-to-noise ratio (SNR) of the transmission can be multiplied by the number of channel dimensions. For example, with a dimension expanding type Shannon mapping, source dimension values may be mapped into two channels thereby roughly doubling the received signal SNR. However, during the decoding process, a branch error may induce a high level of error in the received Shannon values. There is thus a need in the field of data communication for improved methods, circuits, devices and systems for transmission.

SUMMARY OF THE INVENTION

The present invention is a method, circuit and system for communicating data. According to some embodiments of the present invention, a data value to be transmitted from a data source transmitter or transceiver to a downstream receiver or transceiver may be Shannon mapped, by functionally associated processing/mapping logic, to a point on a shape (e.g. spiral) within a higher dimensional (e.g. two) plane. Different portions of the shape, for example branches of a spiral, may be designated by a portion or branch number. Coordinates of the Shannon mapping, or another descriptors, of the Shannon mapped point may be transmitted using analog transmission methods, for example an amplitude modulate sine/cosine pair. According to further embodiments of the present invention, a set of data values may be Shannon mapped and transmitted to a downstream receiver/transceiver in series. For each set of mapped and transmitted data values, processing logic may calculate a branch ambiguity resolution factor, e.g. a branch redundancy value or a redundancy vector based on a function applied to all the shape portion numbers or shape branch numbers associated with the set of data values. For example, one branch ambiguity resolution factor containing 16 bits may be computed for 128 Shannon mapped values. The branch ambiguity resolution factor for each set of values may be transmitted to the downstream receiver/transceiver before, after or with the data values. Decoding logic associated with the downstream receiver/transceiver may then use the branch ambiguity resolution factor to convert/decode received coordinates associated with the set of values into the data values.

According to some embodiments of the present invention, redundancy values or redundancy vectors associated with a branch ambiguity resolution factor may be computed using a systematic linear block code wherein the linear block code may contain branch numbers represented by block code data. Redundancy may be computed using a parity generation matrix. According to further embodiments of the present invention, redundancy values and/or vectors may be transmitted to a downstream receiver/transceiver. According to yet further embodiments of the present invention, the block code data part may be inferred from the transmitted Shannon mappings at the receiver end.

According to some embodiments of the present invention, branch numbers may be denoted as $B_1, B_2 \ldots B_K \in GF(q)$, Where $GF(q)$ is a Galois Field (i.e. finite field) with q elements. According to further embodiments of the present invention, a parity generation matrix may be denoted as $C_{P \times K}$ whereby the branch parity/redundancy values and/or vectors may be denoted as $R_{P \times 1}$ and computed as $R_{P \times 1} = C_{P \times K} \cdot (B_1, B_2 \ldots B_K)^T$.

According to some embodiments of the present invention, a parity generation matrix may be generated using cosets of a branch B, (e.g. $B_K$ mod 2 instead of $B_1, B_2 \ldots$). According to some embodiments of the present invention, a low density parity check (LDPC) code may be used as a suitable linear code. According to further embodiments of the present invention where the parity generation matrix is sparse, having a fixed and small number of ones per column and per row may be advantageous. Employing a LDPC code with a fixed and small number of ones may allow for very large code words including many Shannon mappings. According to some embodiments of the present invention, the LDPC code can be decoded iteratively using a sum product algorithm. According to some embodiments of the present invention, a systematic convolutional code may be used instead of LDPC code.

According to some embodiments of the present invention, a transmission may comprise a Shannon mapping, (e.g. $S_k = (x_k, G \cdot (x_k \mod 1/G))$, for k=1:K) and a branch redundancy vector (e.g. $R_{P \times 1} = C_{P \times K} \cdot (B_1, B_2 \ldots B_K)^T$).

According to some embodiments of the present invention, there may be provided a data to symbol mapping circuit, logic, or module integral with or otherwise functionally associated with a transmitter. According to further embodiments of the present invention, there may be provided a corresponding symbol to data de-mapping circuit, logic or module integral or otherwise functionally associated with a receiver. The mapping and corresponding de-mapping logic, circuit or module may be characterized by a Shannon mapped distribution of symbols, and optionally may be characterized by a source space (e.g. one dimensional) that is mapped on a shape within a higher dimensional space (e.g. two dimensional).

According to some embodiments of the present invention, the Shannon mapped distribution of symbols includes a space packing one dimension (1D) curve in a two dimension (2D) space. The total length of the curve may be inversely proportional to a constant distance between the branches of the curve. According to further embodiments of the present invention, a symbol may be represented by a 1D analog variable with a value between 0 and 1. The 1D analog variable may be mapped to any point along the space filling 1D curve by multiplying the analog value by the length of the curve. According to further embodiments of the present invention, de-mapping a received Shannon mapped distribution of symbols may include extracting an analog Value based on a determined symbol location along the space filling curve.

According to some embodiments of the present invention, the Shannon mapped distribution of symbols includes a chainsaw-like modulo curve. According to further embodiments of the present invention, a symbol may be represented by a 1D analog variable with a value between 0 and 1. According to further embodiments of the present invention, the 1D analog variable may be mapped to any point along the chainsaw-like modulo curve by calculating an $x_1$ axis value and an $x_2$ axis value. The $x_1$ axis value may be determined by multiplying the analog variable by the length of the $x_1$ axis. The $x_2$ axis value may be determined by calculating the product of the analog variable, the length of the $x_2$ axis and the number of curve branches modulo the length of the $x_2$ axis. According to further embodiments of the present invention, de-mapping a received Shannon mapped distribution of symbols may include extracting an analog value based on a determined symbol location along the chainsaw-like modulo curve.

According to some embodiments of the present invention, video data or information to be transmitted may be in the form of: (1) a complete frame data set (also referred to as a Base Frame), or (2) one or more image transform instructions or parameters (also referred to as a Delta Frame) which instructs an image processor associated with a video sink to modify a previously received/constructed/rendered video frame into a current frame. A Delta Frame according to some embodiments of the present invention may include one or more Grid Based Predicted Error ("GBPE") Values. Further details with regard to methods and systems for transmission of video data between a video source transceiver and a video sink transceiver are described in U.S. patent app 61/282,301 which application is hereby incorporated by reference in its entirety.

The GBPE may be generated by source-side image processing logic, at or near the video source, using processes or techniques similar to those described in the MPEG and/or H.264 Standards, with the exception that the prediction error values may be calculated relative to a noisy predicted frame (e.g. based on analog reception of base frame) which has been grid quantized based on receiver SNR (e.g. substantially each pixel value in the predicted frame is rounded off up or down to a value on some grid).

According to further embodiments of the present invention, given GBPE values received at a video sink may be used to generate a complete viewable frame by modifying a sink side generated noisy predicted frame roughly corresponding to the source side predicted frame from which the given GBPE values were generated. The corresponding sink side predicted frame may also be grid quantized using a sink side grid with a value-order or value-structure corresponding to that of the source side grid used to quantize the source side predicted frame from which the given GBPE values were calculated.

According to some embodiments of the present invention, decoding a received signal may include decoding branch numbers associated with the signal and extracting analog data values by de-mapping a received Shannon mapping.

According to some embodiments of the present invention, branch number decoding may be performed by utilizing a forward error correction decoding scheme (e.g. a sum product algorithm for LDPC decoder). According to further embodiments of the present invention, a conventional systematic forward error correction decoder may be used. Either decoder may use branch numbers estimated from received Shannon mapping in conjunction with received branch redundancy vector (e.g. $R_{P \times 1}$) in order to decode the branch numbers. According to further embodiments of the present invention, if the transmitted Shannon mapping was $S_k=(x_k, G \cdot (x_k \bmod 1/G))$ then the received noisy Shannon mapping is $y_k=x_k+v_k$ and $z_k=G \cdot (x_k \bmod 1/G)+w_k$, (where $v_k$ and $w_k$ are noise random variables). According to further embodiments of the present invention, a branch soft value may be computed as $B_{k\ EST}=G \cdot (y_k-z_k/G)=G \cdot (x_k-(x_k \bmod 1/G)+G \cdot v_k+w_k))$. The left term $G \cdot (x_k-(x_k \bmod 1/G)) \in 0, 1, \ldots, G-1$ may be considered a branch number while the right terms may be considered noise. According to further embodiments of the present invention, computed branch soft values (e.g. $B_{k\ EST}$, for k=1 ... K) and soft redundancy values (Rp, for p=1 ... P) may be input to the decoder to determine decoded branch numbers (e.g. $B_{k\ DEC}$, for k=1 ... K).

According to some embodiments of the present invention, analog data values may be extracted from a received Shannon mapping by de-mapping the Shannon mapping. According to further embodiments of the present invention, a Shannon mapping e.g. $S_k=(x_k, G \cdot (x_k \bmod 1/G))$ may be received where $x_k$ represents extractable data. According to further embodiments of the present invention, we now have two estimators for $x_k$ based on the received noisy data vectors $y_k=x_k+v_k$ and $t_k=(z_k+B_{k\ DEC}) \cdot 1/G$. Since the Signal-to-Noise ratio (SNR) of $t_k$ is $G^2$ higher than $y_k$, they may be linearly combined (e.g. maximal ratio combining) to produce the final extracted data vector e.g. $x_{k\ EST}=(y_k+t_k*G^2)/(1+G^2)$.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
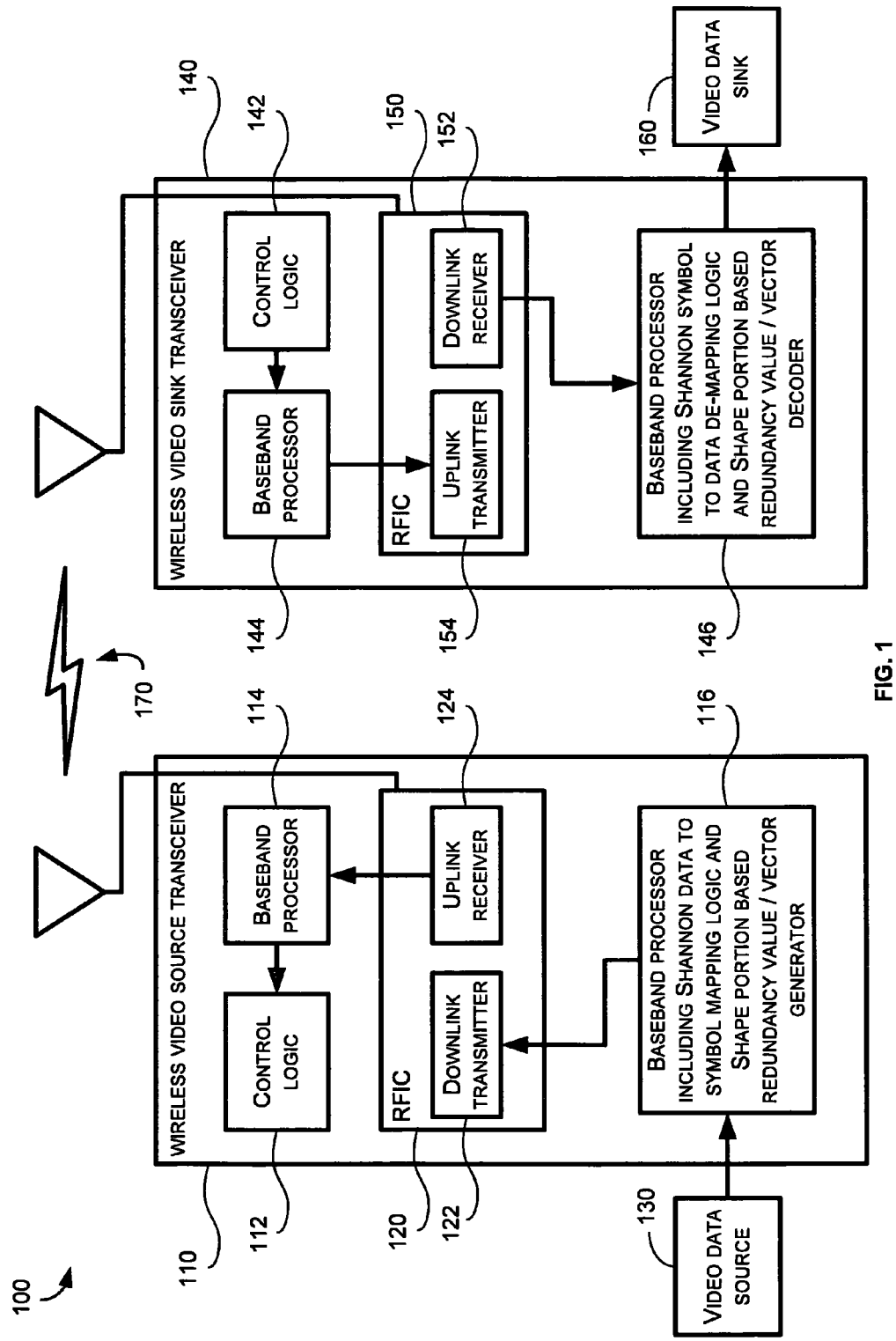
FIG. 1 shows an exemplary video source transceiver and video sink transceiver arrangement, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Some demonstrative embodiments may be implemented to communicate wireless-video signals over a wireless-video communication link, as well as Wireless-Local-Area-Network (WLAN) signals over a WLAN link. Such implementation may allow a user, for example, to play a movie, e.g., on a laptop computer, and to wirelessly transmit video signals corresponding to the movie to a video destination, e.g., a screen, while maintaining a WLAN connection, e.g., with the Internet and/or one or more other devices connected to a WLAN network. In one example, video information corresponding to the movie may be received over the WLAN network, e.g., from the Internet.

According to some embodiments of the present invention, there may be a transmitter comprising a data to symbol mapping circuit adapted to convert source data into a transmission symbol using a Shannon-mapping and processing logic adapted to calculate and transmit branch ambiguity resolution factor associated with the source data. According to further embodiments of the present invention, the branch ambiguity resolution factor may be a data value or vector based on a function applied to shape branch numbers associated with a set of Shannon mappings. According to further embodiments of the present invention, the branch ambiguity resolution factor may be the redundancy of a systematic linear block code wherein the systematic block code data may contain the branch numbers.

According to some embodiments of the present invention, the linear block code may include a low density parity check code. According to further embodiments of the present invention, the branch ambiguity resolution factor may include a parity generation matrix to calculate a redundancy value for associated Shannon mapped data.

According to some embodiments of the present invention, the Shannon mapping may include a distribution of symbols along a space packing one dimension curve in a two dimension space. According to further embodiments of the present invention, the Shannon mapping may include a distribution of symbols along a chainsaw-like modulo curve.

According to some embodiments of the present invention, there may be a receiver comprising a symbol to data de-mapping circuit adapted to convert a transmission symbol from a Shannon-mapping into sink data utilizing a received branch ambiguity resolution factor. According to further embodiments of the present invention, the received branches and the ambiguity resolution factor may be decoded by a sum product algorithm, a systematic convolutional code or any other suitable algorithm or code.

According to some embodiments of the present invention, there may be a video source transceiver comprising a video source interface adapted to receive video based data from a functionally associated video data source, a data to symbol mapping circuit adapted to convert the video based data into transmission symbols using a Shannon mapping, processing logic adapted to calculate a branch ambiguity resolution factor associated with sets of multiple Shannon mappings and a downlink transmitter circuit adapted to transmit the transmission symbols and associated branch ambiguity resolution factor.

According to some embodiments of the present invention, the branch ambiguity resolution factor may be a data value or vector based on a function applied to shape branch numbers associated with a set of multiple Shannon mappings. According to further embodiments of the present invention, the branch ambiguity resolution factor may include a systematic linear block code wherein the systematic block code data may contain the branch numbers. According to further embodiments of the present invention, the linear block code may be a low density parity check code. According to further embodiments of the present invention, the branch ambiguity resolution factor may include a parity generation matrix to calculate a redundancy value for associated Shannon mapped data. According to some embodiments of the present invention, the Shannon mapping may include a distribution of symbols along a space packing one dimension curve in a two dimension space. According to some embodiments of the present invention, the Shannon mapping may include a distribution of symbols along a chainsaw-like modulo curve.

According to some embodiments of the present invention, there may be a video sink transceiver comprising a downlink receiver circuit adapted to receive a transmission symbol, a symbol to data de-mapping circuit adapted to convert the transmission symbol from a Shannon-mapping into sink data utilizing a received branch ambiguity resolution factor and a video sink interface adapted to transmit the sink data to a functionally associated video data sink. According to further embodiments of the present invention, the received branch ambiguity resolution factor may be decoded by a sum product algorithm, a systematic convolutional decoder or any other suitable algorithm or code.

Now turning to FIG. 1, there is shown an exemplary video source transceiver and video sink transceiver arrangement (100), according to some embodiments of the present invention.

According to some embodiments of the present invention, a wireless video source transceiver (110) may include a radio-frequency integrated chip (RFIC) (120) to transmit and receive data signals along a functionally associated antenna. According to further embodiments of the present invention, the RFIC may include a downlink transmitter (122) for transmitting downlink data signals and an uplink receiver (124) for receiving uplink data signals.

According to some embodiments of the present invention, the wireless video source transceiver (110) may include a baseband processor (114) to process control signals received via the uplink receiver (124) and send the data to a functionally associated control circuit and/or processor (112). According to some embodiments of the present invention, the wireless video source transceiver (110) may include a baseband processor (116) to take incoming video data signals from a functionally associated video data source (130) and process the data for downlink transmission, via the downlink transmitter (122), to a functionally associated wireless video sink transceiver (140). The processing may include data to symbol Shannon mapping and branch ambiguity resolution factor (e.g. shape portion based redundancy value and/or vector) generation.

According to some embodiments of the present invention, a wireless video sink transceiver (140) may include a RFIC chip (150) to transmit and receive data signals along a functionally associated antenna. According to further embodiments of the present invention, the RFIC may include a downlink receiver (152) for receiving downlink data signals and an uplink transmitter (154) for transmitting uplink data signals.

According to some embodiments of the present invention, the wireless video sink transceiver (140) may include a baseband processor (144) to process control data received from a functionally associated control circuit and/or processor (142) and send the control data to the uplink transmitter (154). According to some embodiments of the present invention, the wireless video sink transceiver (140) may include a baseband processor (146) to take video data signals received, via the downlink receiver (152), from a functionally associated wireless video source transceiver (110) and process the data for a functionally associated video data sink (160). The processing may include symbol to data Shannon de-mapping in conjunction with branch ambiguity resolution factor (e.g. branch redundancy value and/or vector) decoding.

Figure 2A:
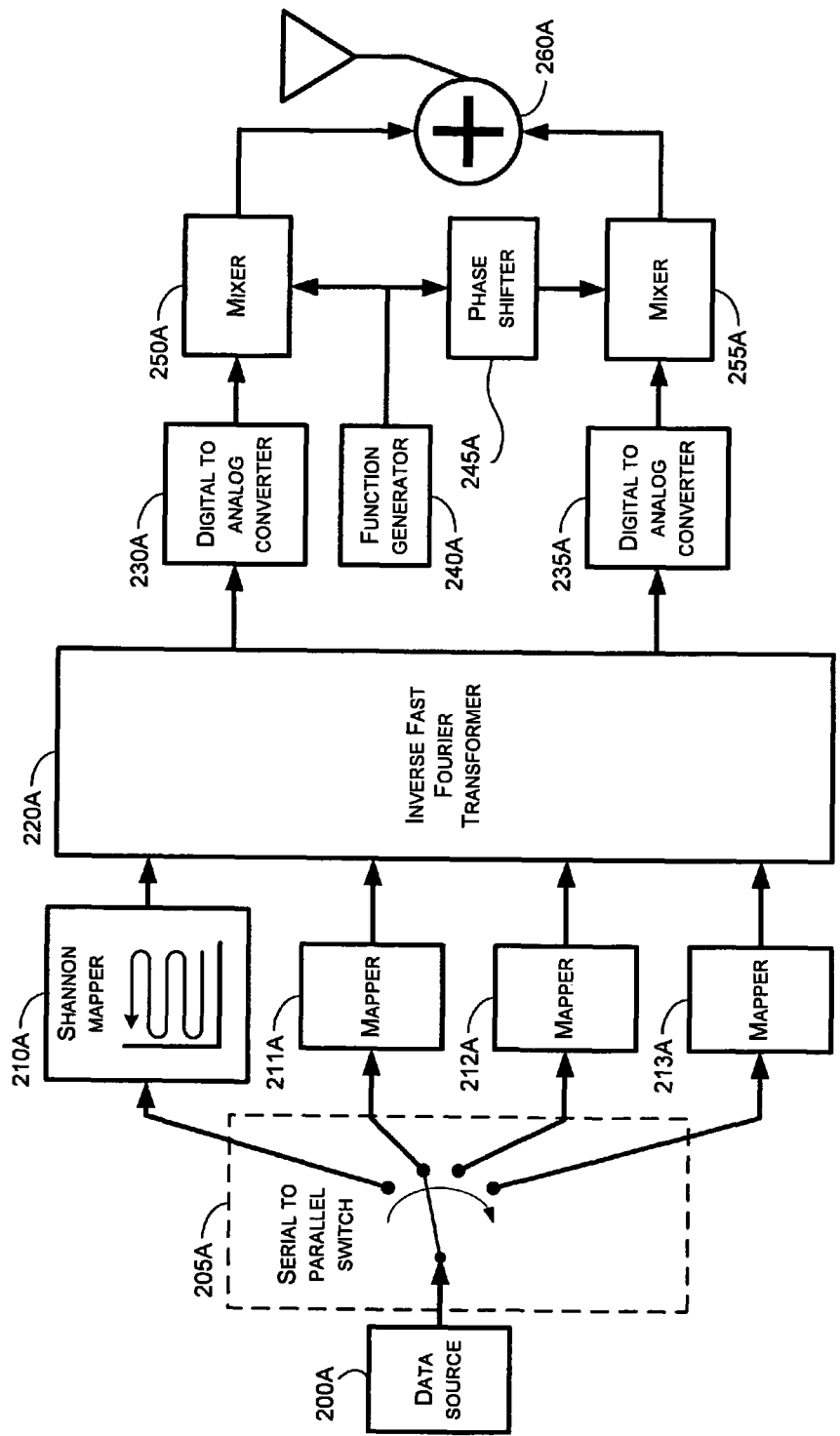
FIG. 2A is a functional block diagram of an exemplary OFDM transmitter circuit according to some embodiments of the present invention where the transmitter includes a Shannon mapping scheme.

Now turning to FIG. 2A, there is shown a functional block diagram of an exemplary OFDM transmitter circuit according to some embodiments of the present invention where the transmitter includes a Shannon mapping scheme.

According to some embodiments of the present invention, there may be included a serial to parallel switch (205A) to take digital data serially from a functionally associated data source (200A) and to load the data into a plurality of functionally associated Shannon mappers (210A-213A). According to some embodiments of the present invention, Shannon mappers may employ a modified complex plane mapping technique such that all mappings to the complex plane are bound within a fixed geometry/shape (e.g. spiral) on the plane. Different portions of the shape, for example branches of a spiral, may be designated by a portion or branch number. According to further embodiments of the present invention, a data value may be output from each Shannon mapper and input as a frequency component, or bin, to a functionally associated Inverse Fast Fourier Transformer (IFFT) (220A).

According to further embodiments of the present invention, the IFFT (220A) may compute an inverse discrete Fourier transform on the input shape data and output a set of complex time-domain digital samples. According to further embodiments of the present invention, the real portions of the complex time-domain digital samples may be converted into an analog signal by a functionally associated digital-to-analog converter (230A). According to further embodiments of the present invention, the imaginary portions of the complex time-domain digital samples may be converted into an analog signal by a functionally associated digital-to-analog converter (235A).

According to further embodiments of the present invention, the analog version of the real portions of the complex time-domain digital samples may be input to a mixer (250A) to modulate a carrier frequency signal output from a function generator (240A). According to further embodiments of the present invention, the analog version of the imaginary portions of the complex time-domain digital samples may be input to a mixer (255A) to modulate a carrier frequency signal output from a function generator (240A) and shifted 90 degrees by a phase shifter (245A). According to further embodiments of the present invention, both modulated carrier frequency signals may be summed by an adder (260A) to produce a transmission signal to be sent via a functionally associated antenna.

Figure 2B:
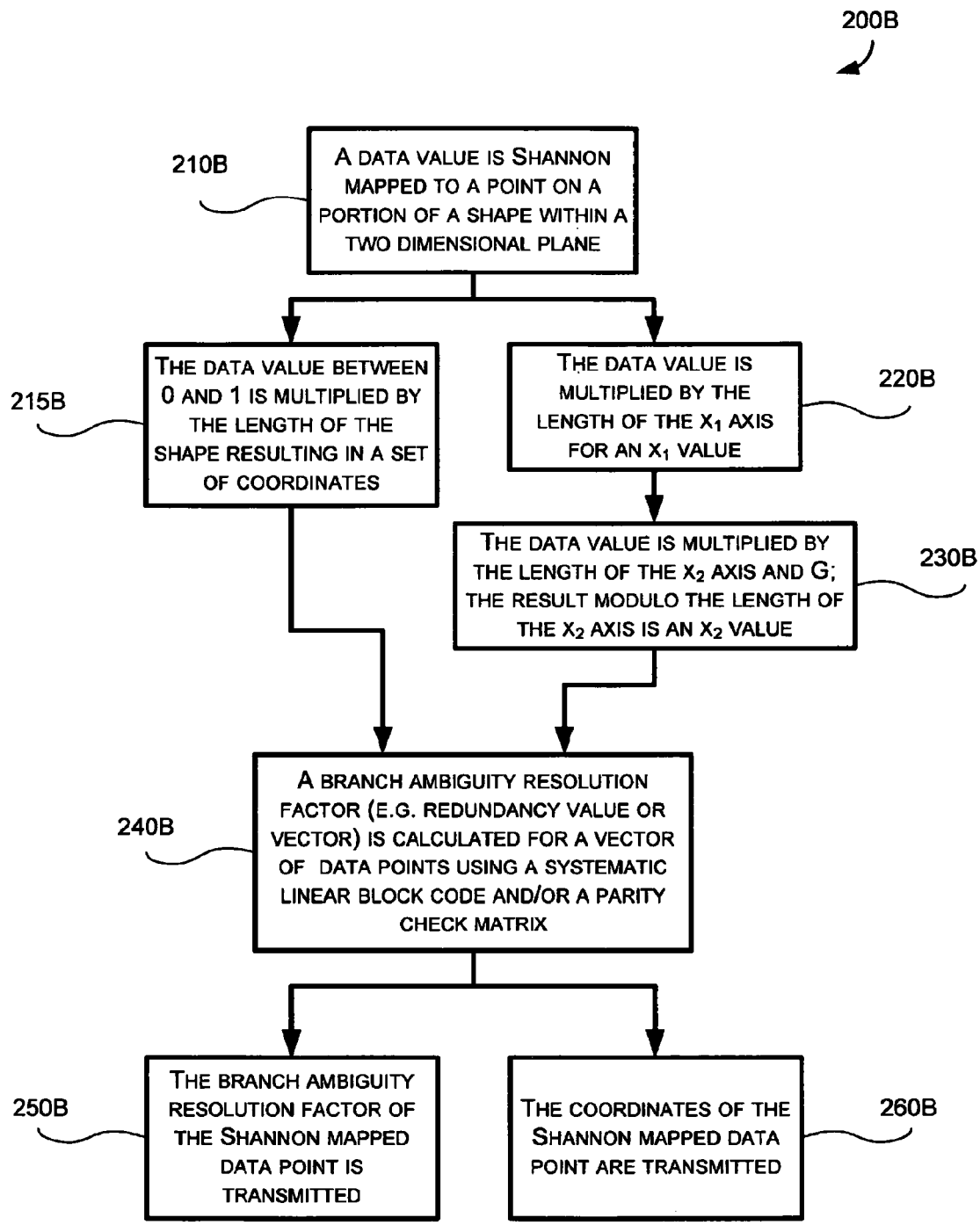
FIG. 2B is a flow chart including the steps of a method by which a data to symbol Shannon mapping circuit may convert source data into a transmission symbol according to some embodiments of the present invention.

Now turning to FIG. 2B, there is shown a flow chart including the steps of a method by which a data to symbol Shannon mapping circuit may convert source data into a transmission symbol according to some embodiments of the present invention.

According to some embodiments of the present invention, a data value may be Shannon mapped (210B) to a point on a portion of a shape within a two dimensional plane. According to further embodiments of the present invention where the shape is a space filling curve, the data value (i.e. a value between 0 and 1) may be multiplied (215B) by the length of the shape resulting in a set of coordinates. According to some embodiments of the present invention where the shape is a chainsaw-like modulo curve, the data value may be multiplied (220B) by the length of the $x_1$ axis for an $x_1$ value. The $x_2$ value may be calculated (230B) as the product of the data value, the length of the $x_2$ axis and the number of curve branches modulo the length of the $x_2$ axis. According to further embodiments of the present invention, a value related to the coordinates of the Shannon mapped data may be transmitted (260B).

According to some embodiments of the present invention, a branch ambiguity resolution factor (e.g. branch redundancy value or vector) may be calculated (240B) for the determined vector of data points using a systematic linear code and/or a parity generation matrix. According to further embodiments of the present invention, the branch ambiguity resolution factor of the Shannon mapped vector may be transmitted (250B).

Figure 3A:
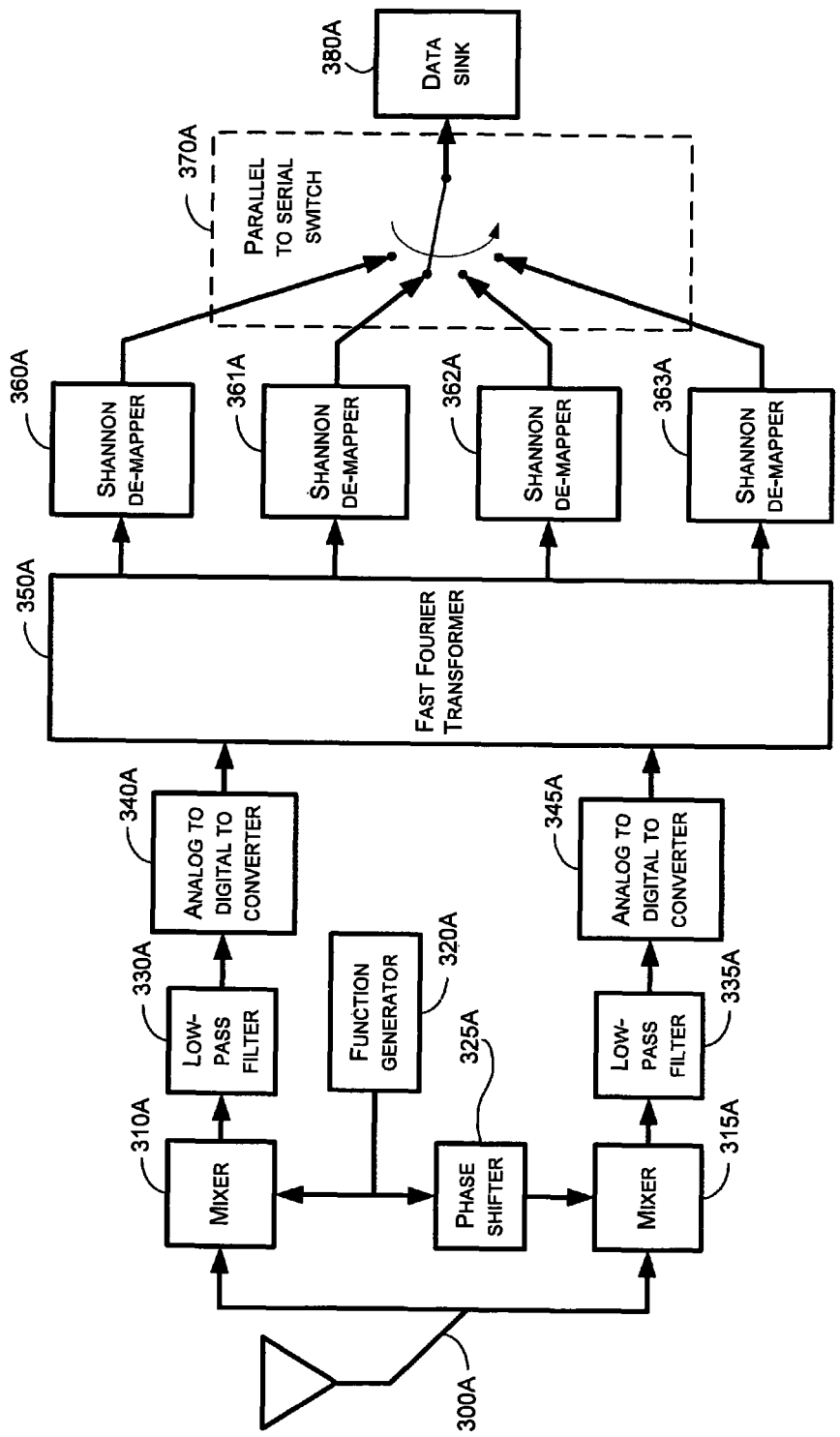
FIG. 3A is a functional block diagram of an exemplary OFDM receiver circuit according to some embodiments of the present invention where the receiver includes a de-mapping and symbol detecting scheme.

Now turning to FIG. 3A, there is shown a functional block diagram of an exemplary OFDM receiver circuit according to some embodiments of the present invention where the receiver includes a de-mapping and symbol detecting scheme.

According to some embodiments of the present invention, there may be included an antenna (300A) to receive a transmission signal produced by a functionally associated OFDM transmitter circuit. According to further embodiments of the present invention, the signal may be quadrature-mixed, by a mixer (310A), with a carrier frequency signal output from a function generator (320A) to produce a baseband version of the transmission signal. According to further embodiments of the present invention, the signal may be filtered by a low-pass filter (330A) to remove undesirable components from the baseband signal. According to further embodiments of the present invention, the baseband signal may be converted to digital form by an analog-to-digital converter (340A). According to further embodiments of the present invention, the digital values may be input to the Fast Fourier Transformer (FFT) (350A) as the real portions of the complex time-domain digital samples.

According to further embodiments of the present invention, the transmission signal may be quadrature-mixed, by a mixer (315A), with a carrier frequency signal output from a function generator (320A) and shifted 90 degrees by a phase shifter (325A) to produce another baseband version of the transmission signal. According to further embodiments of the present invention, the signal may be filtered by a low-pass filter (335A) to remove undesirable components from the baseband signal. According to further embodiments of the present invention, the baseband signal may be converted to digital form by an analog-to-digital converter (345A). According to further embodiments of the present invention, the digital values may be input to the FFT (350A) as the imaginary portions of the complex time-domain digital samples.

According to further embodiments of the present invention, the FFT (350A) may perform a discrete Fourier transform on the real portions of the complex time-domain digital samples and the imaginary portions of the complex time-domain digital samples. According to further embodiments of the present invention, the FFT (350A) may output several parallel frequency components which are input to Shannon de-mappers (360A-363A). According to further embodiments of the present invention, the Shannon de-mappers (360A-363A) may output digital values representing the original digital data produced by a functionally associated data source (200A). According to further embodiments of the present invention, the digital values may be sampled by a parallel to serial switch (370A) and delivered serially to a functionally associated data sink (380A).

Figure 3B:
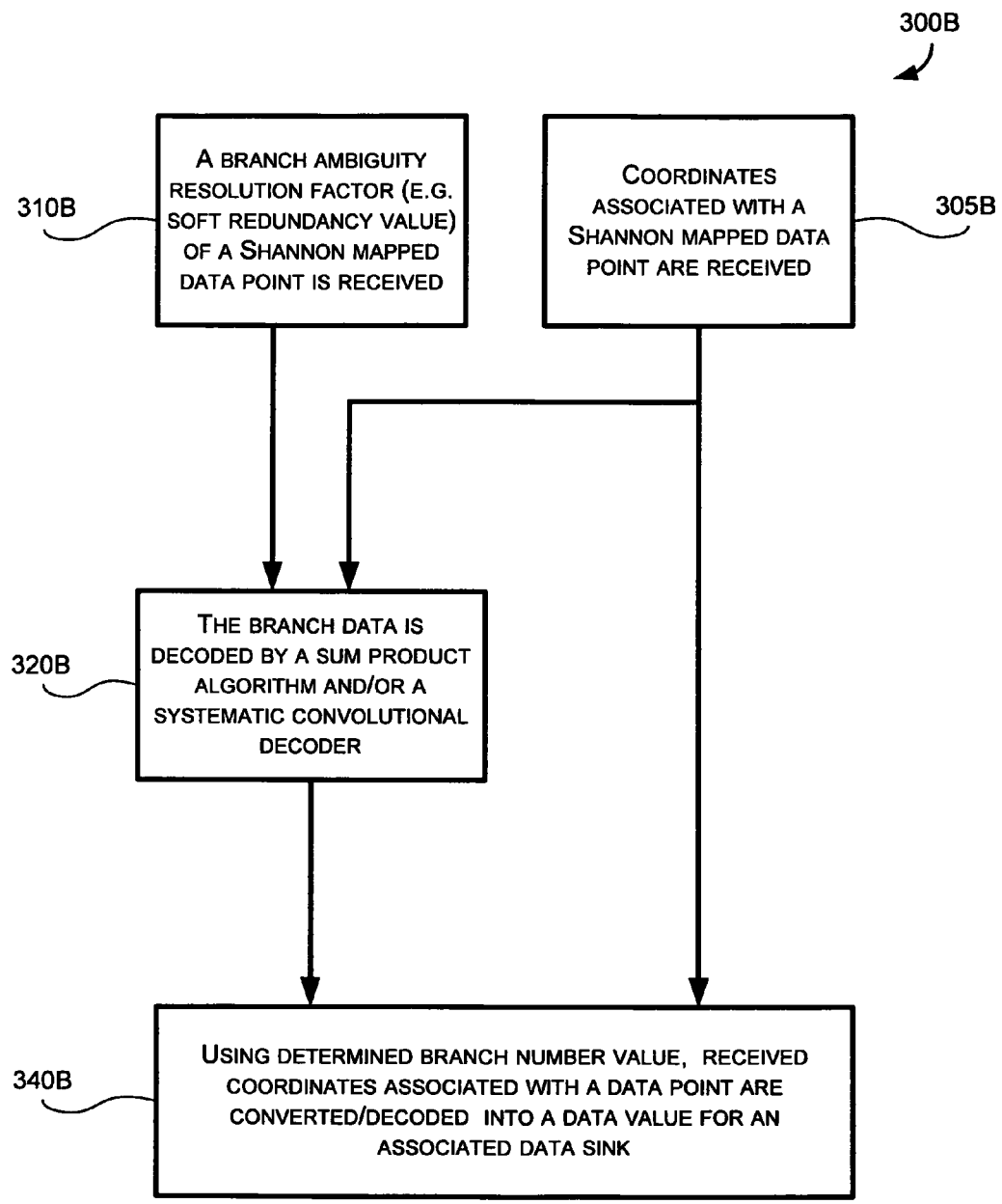
FIG. 3B is a flow chart including the steps of a method by which a symbol to data Shannon de-mapping circuit may convert a transmission symbol into source data according to some embodiments of the present invention.

Now turning to FIG. 3B, there is shown a flow chart including the steps of a method by which a symbol to data Shannon de-mapping circuit may convert a transmission symbol into estimated source data according to some embodiments of the present invention.

According to some embodiments of the present invention, coordinates associated with a Shannon mapped data point may be received (305B) from a functionally associated transmitter. According to some embodiments of the present invention, a branch ambiguity resolution factor (e.g. soft redundancy value) of a set of Shannon mapped data points may be received (310B) from a functionally associated transmitter. According to further embodiments of the present invention, the soft redundancy values may be augmented with soft branch values obtained from the Shannon mapping. This aggregate word may be decoded (320B) by a sum product algorithm and/or a systematic convolutional code, to obtain decoded branch numbers. According to further embodiments of the present invention, using the determined branch number value, received coordinates associated with the data point may be converted and/or decoded into a data value for a functionally associated data sink.

Figure 4A:
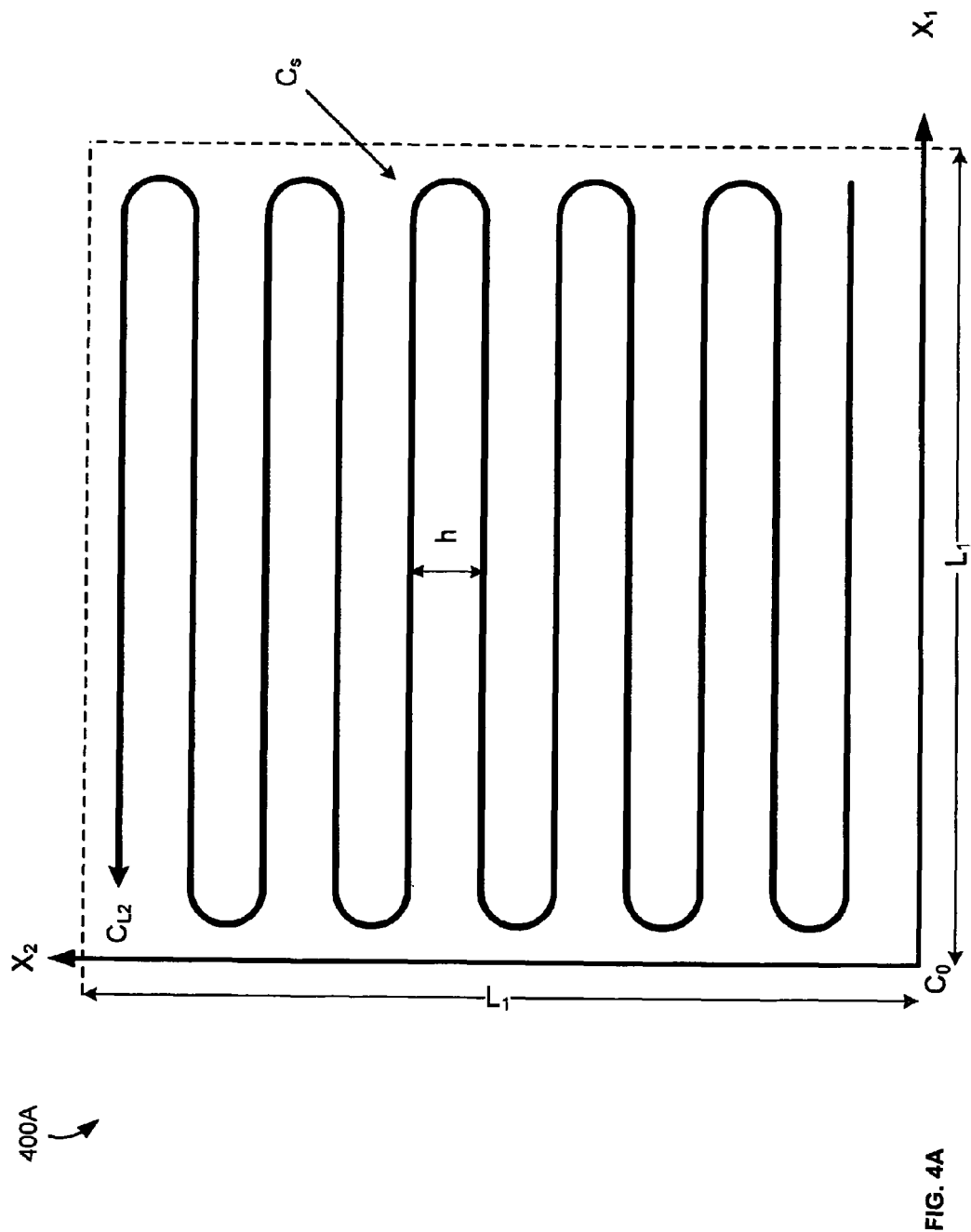
FIG. 4A is an illustration of a Shannon map according to some embodiments of the present invention where the map includes a space packing 1D curve in a 2D space.

Now turning to FIG. 4A, there is shown an illustration of a Shannon map according to some embodiments of the present invention where the map includes a space packing 1D curve in a 2D space (400A).

According to some embodiments of the present invention; the Shannon mapped distribution of symbols includes a space packing one dimension (1D) curve (C) in a two dimension (2D) space. The total length of the curve ($C_{L2}$) may be inversely proportional to a constant distance between the branches of the curve (h). According to further embodiments of the present invention, a symbol may be represented by a 1D analog variable with a value between 0 and 1. The 1D analog variable may be mapped to any point along the space filling 1D curve by multiplying the analog value by the length of the curve ($C_S$).

Figure 4B:
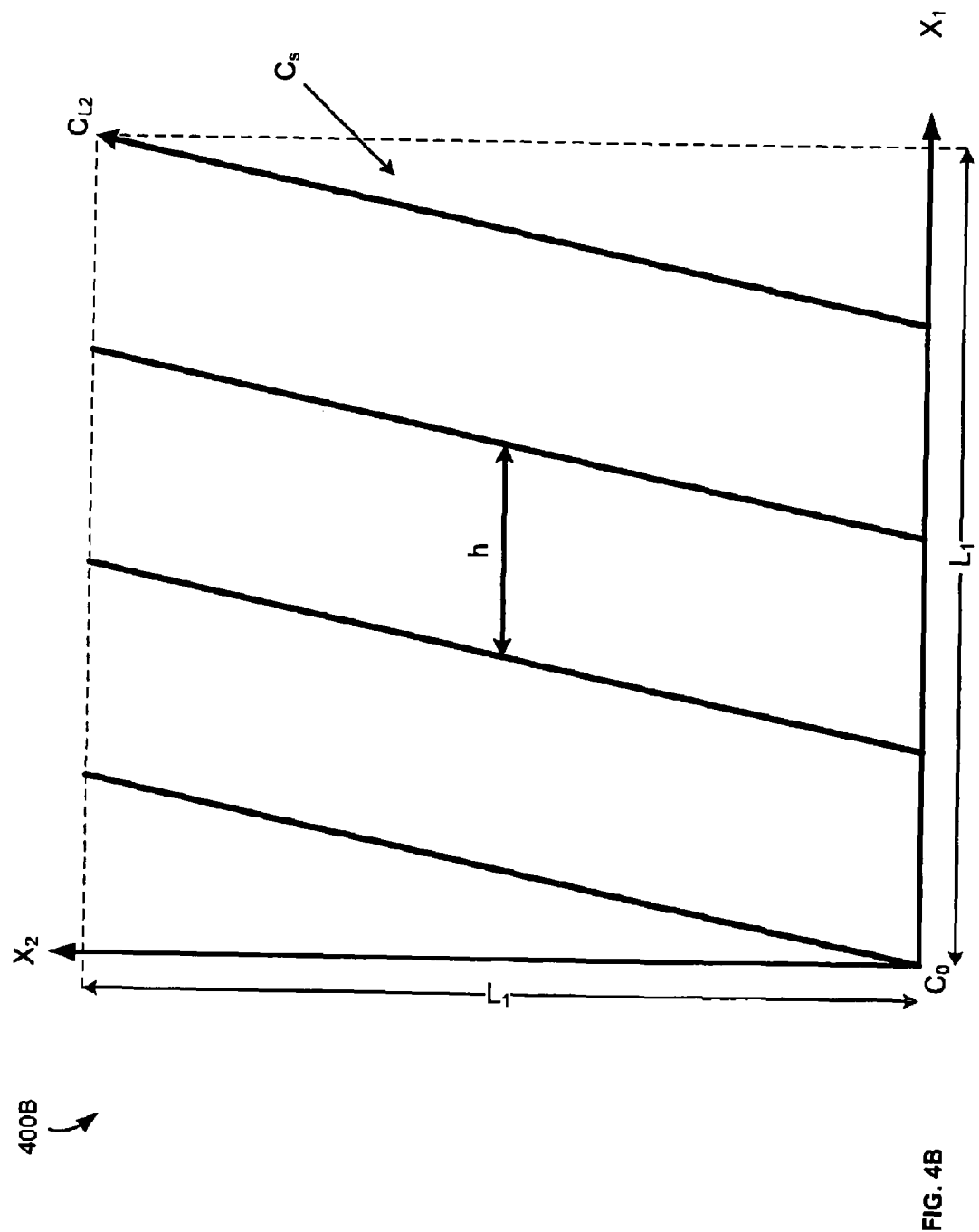
FIG. 4B is an illustration of a Shannon map according to some embodiments of the present invention where the map includes a chainsaw-like modulo curve.

Now turning to FIG. 4B, there is shown an illustration of a Shannon map according to some embodiments of the present invention where the map includes a chainsaw-like modulo curve (400B).

According to some embodiments of the present invention, the Shannon mapped distribution of symbols includes a chainsaw-like modulo curve (C). According to further embodiments of the present invention, a symbol may be represented by a 1D analog variable with a value between 0 and 1. According to further embodiments of the present invention, the 1D analog variable may be mapped to any point along the chainsaw-like modulo curve by calculating an $x_1$ axis value and an $x_2$ axis value. The $x_1$ axis value may be determined by multiplying the analog variable by the length of the $x_1$ axis ($L_1$). The $x_2$ axis value may be determined by calculating the product of the analog variable, the length of the $x_2$ axis ($L_1$) and the number of curve branches (e.g. G=4) modulo the length of the $x_2$ axis.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A transmitter comprising:
    a data to symbol mapping circuit adapted to convert source data into a transmission symbol using a Shannon-mapping; and
    processing logic adapted to calculate and transmit branch ambiguity resolution factor associated with the source data
    wherein the branch ambiguity resolution factor is: (a) a data value or vector based on a function applied to shape branch numbers associated with a set of Shannon mappings and (b) the redundancy of a systematic linear block code wherein the systematic block code data contains the branch numbers.

2. The transmitter according to claim 1, wherein the linear block code includes a low density parity check code.

3. The transmitter according to claim 1, wherein the branch ambiguity resolution factor includes a parity generation matrix to calculate a redundancy value for associated Shannon mapped data.

4. The transmitter according to claim 1, wherein the Shannon mapping includes a distribution of symbols along a space packing one dimension curve in a two dimension space.

5. The transmitter according to claim 1, wherein the Shannon mapping includes a distribution of symbols along a chainsaw-like modulo curve.

6. A video source transceiver comprising:
    a video source interface adapted to receive video based data from a functionally associated video data source;
    a data to symbol mapping circuit adapted to convert the video based data into transmission symbols using a Shannon mapping;
    processing logic adapted to calculate a branch ambiguity resolution factor associated with sets of multiple Shannon mappings; and
    a downlink transmitter circuit adapted to transmit the transmission symbols and associated branch ambiguity resolution factor
    wherein the branch ambiguity resolution factor (a) is a data value or vector based on a function applied to shape branch numbers associated with a set of multiple Shannon mappings and (b) includes a systematic linear block code wherein the systematic block code data contains the branch numbers.

7. The video source transceiver according to claim 6, wherein the linear block code includes a low density parity check code.

8. The video source transceiver according to claim 6, wherein the branch ambiguity resolution factor includes a parity generation matrix to calculate a redundancy value for associated Shannon mapped data.

9. The video source transceiver according to claim 6, wherein the Shannon mapping includes a distribution of symbols along a space packing one dimension curve in a two dimension space.

10. The video source transceiver according to claim 6, wherein the Shannon mapping includes a distribution of symbols along a chainsaw-like modulo curve.

* * * * *